(12) United States Patent
Anspaugh et al.

(10) Patent No.: US 11,225,281 B2
(45) Date of Patent: Jan. 18, 2022

(54) STEERING COLUMN ASSEMBLY

(71) Applicant: Steering Solutions IP Holding Corporation, Saginaw, MI (US)

(72) Inventors: Michael P. Anspaugh, Bay City, MI (US); Joen C. Bodtker, Gaines, MI (US); Donald A. Buzzard, Saginaw, MI (US); Tyler M. Reno, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 16 days.

(21) Appl. No.: 16/670,346

(22) Filed: Oct. 31, 2019

(65) Prior Publication Data
US 2020/0198685 A1 Jun. 25, 2020

Related U.S. Application Data

(60) Provisional application No. 62/783,721, filed on Dec. 21, 2018.

(51) Int. Cl.
*B62D 1/19* (2006.01)

(52) U.S. Cl.
CPC ..................... *B62D 1/19* (2013.01)

(58) Field of Classification Search
CPC ........... B62D 1/19; B62D 1/192; B62D 1/195
See application file for complete search history.

(56) References Cited

U.S. PATENT DOCUMENTS

| 5,829,310 A * | 11/1998 | DePaolis | B62D 1/192 74/492 |
|---|---|---|---|
| 6,039,502 A * | 3/2000 | Naff | B62D 1/16 280/777 |
| 2004/0195816 A1 * | 10/2004 | Park | B62D 1/184 280/775 |
| 2004/0217581 A1 | 11/2004 | Dubay | |
| 2006/0290128 A1 | 12/2006 | Ridgway | |
| 2007/0290128 A1 * | 12/2007 | Hashimoto | G01N 27/622 250/286 |

(Continued)

FOREIGN PATENT DOCUMENTS

| CN | 202481129 U | 10/2012 |
|---|---|---|
| CN | 106184339 A | 12/2016 |

(Continued)

OTHER PUBLICATIONS

Search Report regarding First Office Action in corresponding CN App No. 2019113263421; dated Nov. 15, 2021.

*Primary Examiner* — James A English
(74) *Attorney, Agent, or Firm* — Dickinson Wright PLLC

(57) ABSTRACT

A steering column assembly includes a lower jacket. The steering column assembly also includes an upper jacket at least partially received within the lower jacket. The steering column assembly further includes a jacket wall integrally formed with the lower jacket, the jacket wall extending longitudinally form a first end to a second end and having a first side and a second side. The steering column assembly yet further includes an energy absorption strap offset from the first side of the jacket wall to form a recess extending along the jacket wall, the energy absorption strap having a first end and a second end, the energy absorption strap having at least one tear line at an interface with the jacket wall.

10 Claims, 12 Drawing Sheets

(56) References Cited

U.S. PATENT DOCUMENTS

| | | | |
|---|---|---|---|
| 2008/0224459 A1* | 9/2008 | Oh .................. | B62D 1/195 |
| | | | 280/777 |
| 2013/0042716 A1* | 2/2013 | Davies ............... | B62D 1/184 |
| | | | 74/493 |
| 2016/0347349 A1* | 12/2016 | Yamamoto ........... | B62D 1/192 |
| 2019/0054948 A1* | 2/2019 | Ancelin ............. | B62D 1/192 |
| 2020/0039570 A1* | 2/2020 | Domig ............... | B62D 1/192 |

FOREIGN PATENT DOCUMENTS

| | | | | |
|---|---|---|---|---|
| CN | 106458245 A | 2/2017 | | |
| KR | 20070028875 A | 10/2007 | | |
| WO | WO-2018073305 A1 * | 4/2018 | ............. | B62D 1/195 |

\* cited by examiner

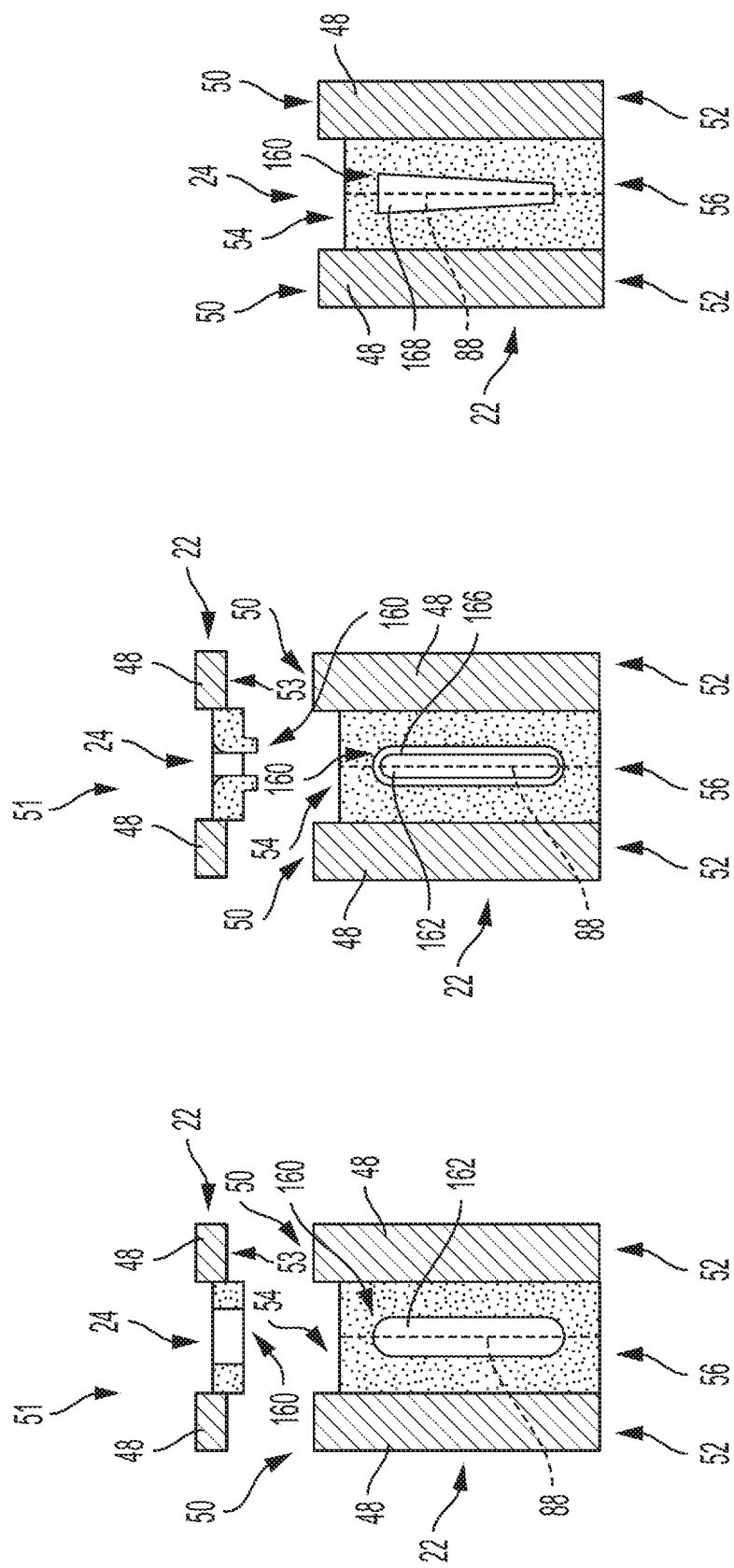

STEERING COLUMN ASSEMBLY

CROSS-REFERENCE TO RELATED APPLICATION

This application claims the benefit of U.S. Provisional Patent Application Ser. No. 62/783,721, filed on Dec. 21, 2018, which is incorporated herein by reference in its entirety.

BACKGROUND

Currently, many steering column assemblies are equipped with kinetic energy absorption devices to reduce effects of an impact event. There are several different types and variations of these kinetic energy absorption devices, typically involving the distortion of metal. Many methods available today use a separate energy absorption assembly that is attached to the steering column assembly.

SUMMARY

According to one aspect of the disclosure, a steering column assembly includes a lower jacket. The steering column assembly also includes an upper jacket at least partially received within the lower jacket. The steering column assembly further includes a jacket wall integrally formed with the lower jacket, the jacket wall extending longitudinally form a first end to a second end and having a first side and a second side. The steering column assembly yet further includes an energy absorption strap offset from the first side of the jacket wall to form a recess extending along the jacket wall, the energy absorption strap having a first end and a second end, the energy absorption strap having at least one tear line at an interface with the jacket wall.

According to another aspect of the disclosure, a steering column assembly includes a lower jacket assembly. The steering column assembly also includes an upper jacket assembly being at least partially received within the lower jacket assembly. The steering column assembly further includes a jacket wall integrally formed with the lower jacket, the jacket wall extending from a first end to a second end and having a first side and a second side, the jacket wall including a pair of lateral portions extending longitudinally from the first end to the second end. The steering column assembly yet further includes an energy absorption strap integrally formed with the jacket wall and located between the lateral portions of the jacket wall, an interface of the energy absorption strap and the lateral portions of the jacket wall forming a pair of tear lines, the energy absorption strap having a central axis located at an equal distance from each interface with the jacket wall. The steering column assembly also includes a dart feature forming at least one protrusion of the energy absorption strap.

According to another aspect of the disclosure, a steering column assembly includes a lower jacket assembly. The steering column assembly also includes an upper jacket assembly at least partially received within the lower jacket assembly. The steering column assembly further includes a jacket wall integrally formed with the lower jacket, the jacket wall extending form a first end to a second end and having a first side and a second side, the jacket wall including a pair of lateral portions extending longitudinally from the first end to the second end. The steering column assembly yet further includes an energy absorption strap integrally formed with the jacket wall and located between the lateral portions of the jacket wall, an interface of the energy absorption strap and the lateral portions forming a pair of tear lines, the energy absorption strap having a central axis located at an equal distance from each interface with the jacket wall. The steering column assembly also includes a slot feature comprising an opening on the energy absorption strap.

These and other advantages and features will become more apparent from the following description taken in conjunction with the drawings.

BRIEF DESCRIPTION OF THE DRAWINGS

The subject matter that is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 24 is a front and top view of the jacket wall with an integrally formed energy absorption strap having a single slot design;

FIG. 25 is a front and top view of the jacket wall with an integrally formed energy absorption strap having a flanged slot design;

FIG. 26 is a front and top view of the jacket wall with an integrally formed energy absorption strap having a tapered slot design;

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
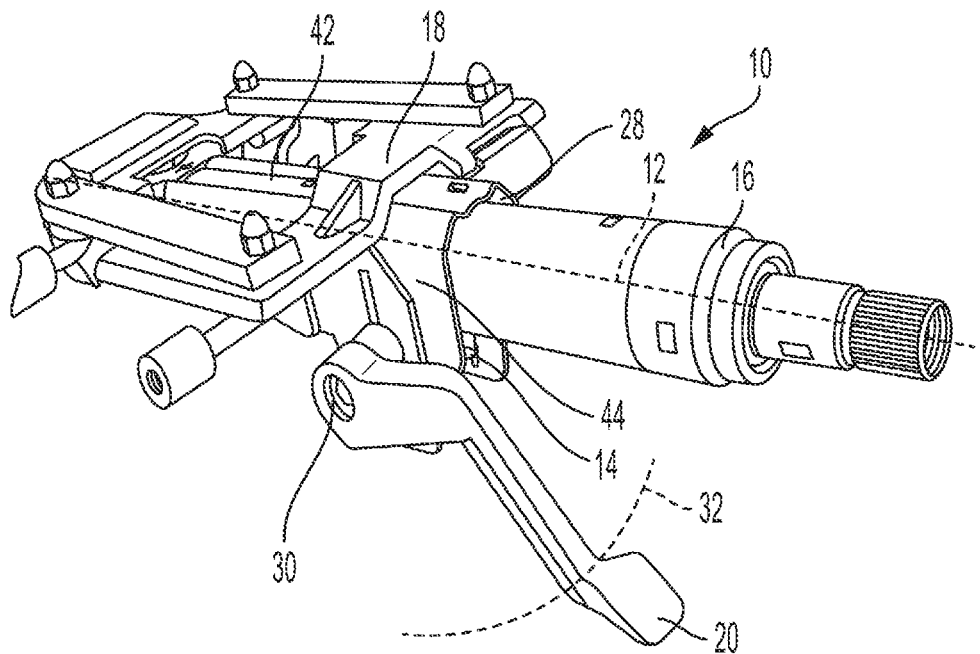
FIG. 1 is an illustration of a steering column assembly.
Figure 2:
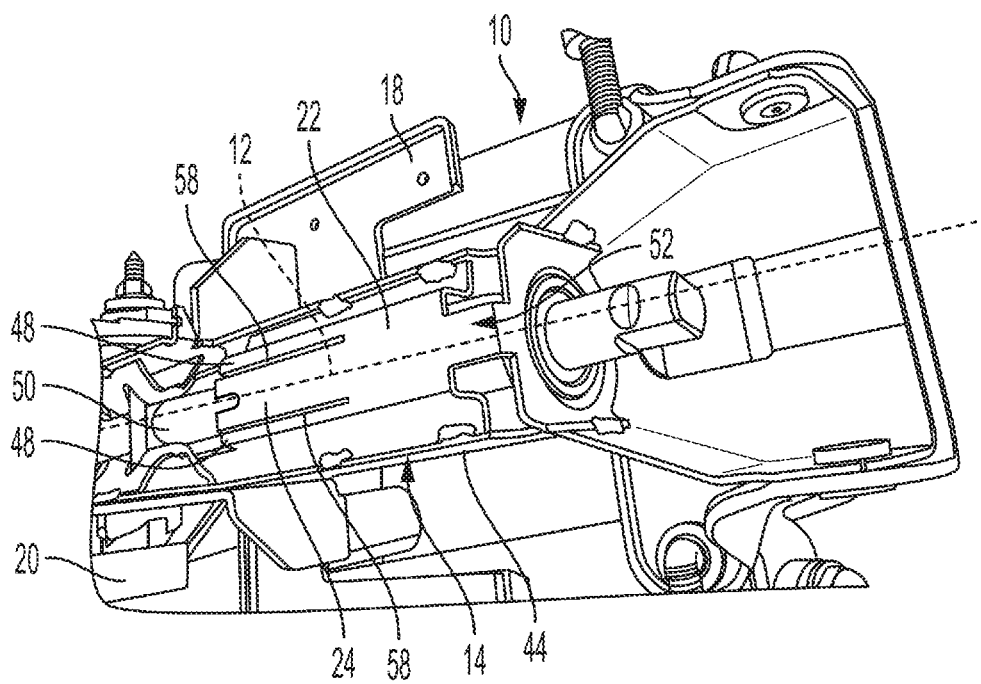
FIG. 2 is an illustration of the lower part of the steering column assembly with a lower jacket assembly having a jacket wall.
Figure 3:
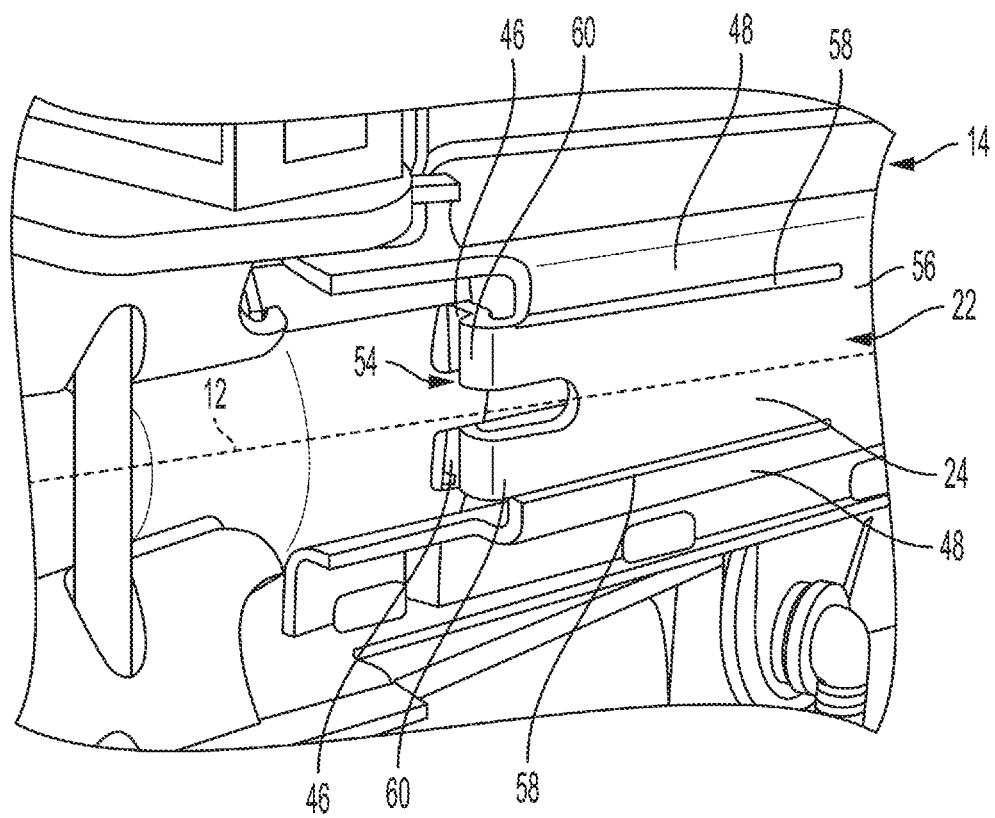
FIG. 3 is an illustration of the lower part of the steering column assembly having a jacket wall.

Referring to FIGS. 1-3, a steering column assembly 10 is shown. The steering column assembly 10 extends along a steering column axis 12. The steering column assembly 10 is configured as a non-telescopic steering column assembly, but at least a portion of the steering column assembly 10 axially translates along the steering column axis 12 for collapsing movement for energy absorption. However, it is to be appreciated that the embodiments disclosed herein may be applied to a telescopically adjusting column. A telescopically adjustable embodiment includes a latching device to selectively engage and disengage the integral energy absorption strap described herein. The steering column assembly 10 includes a lower jacket assembly 14, an upper jacket assembly 16, a mounting bracket 18, a rake adjustment lever 20, a jacket wall 22, and an energy absorption strap 24.

The lower jacket assembly 14 is connected to a vehicle structure (not shown) by the mounting bracket 18. The lower jacket assembly 14 defines an opening 28 that at least partially receives the upper jacket assembly 16. The upper jacket assembly 16 is translatable along the steering column axis 12 when a crash load exceeds the design threshold. The adjustment lever 20 is configured to enable rake angle adjustment relative to the mounting bracket 18 about the pivot axis.

The adjustment lever 20 is pivotally connected to at least one of the lower jacket assembly 14, the upper jacket assembly 16, and the mounting bracket 18. In at least one embodiment, the adjustment lever 20 is pivotally connected to the lower jacket assembly 14, the upper jacket assembly 16, and the mounting bracket 18 by a fastener 30 that extends through each of the lower jacket assembly 14, the upper jacket assembly 16, and the mounting bracket 18.

The adjustment lever 20 is pivotable or movable between a first position and a second position by an operator of the vehicle. The adjustment lever 20 is pivotable or movable between the first position and the second position about a substantially transverse arc path 32 of the lever which is substantially transverse to the steering column axis 12. The first position of the adjustment lever 20 corresponds to a position in which the upper jacket assembly 16 is inhibited from movement or rake adjustment relative to the mounting bracket 18 about the pivot axis. The first position maintains the overall jacket assembly 14, 16—and therefore a steering wheel if connected thereto—in a position stable for driving. The second position of the adjustment lever 20 corresponds to a position in which the combined jacket assembly 14, 16 is permitted for movement or rake adjustment relative to the mounting bracket 18 about the pivot axis.

Figure 4:
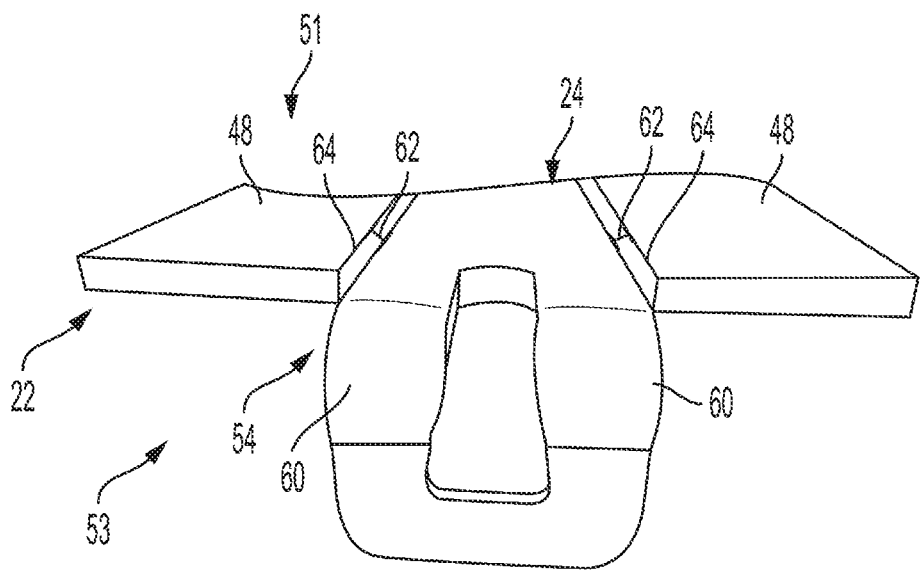
FIG. 4 is a partial view of the jacket wall with an integrally formed energy absorption strap shown in a first end view.

The lower jacket assembly 14 includes a lower portion referred to herein as the jacket wall 22, an upper portion 42, and two side walls 44. The jacket wall 22 interfaces the lower jacket assembly 14 with the upper jacket assembly 16 by engaging with an opening 46 in the upper jacket assembly 16. The jacket wall 22 also has a pair of lateral portions 48 extending longitudinally from a first end 50 to a second end 52 of the jacket wall 22. The jacket wall 22 also has a first side 53 that faces inward towards the upper jacket assembly and a second side 51 that faces outward away from the upper jacket assembly (FIG. 4). The energy absorption strap 24 is located on the jacket wall 22 between the lateral portions 48 of the jacket wall 22 of the lower jacket assembly 14. The energy absorption strap 24 has a first end 54 and a second end 56, and at least one tear line 58 at an interface with the jacket wall 22.

Referring to FIGS. 2-4, the energy absorption strap 24 has a loop arrangement 60 at its first end 54 which engages with the opening 46 of the upper jacket assembly 16. The energy absorption strap 24 also has an offset 62 from the jacket wall 22. The offset being on the first side 51 of the jacket wall 22. The offset 62 creates the tear lines 58 on either side where the energy absorption strap 24 interfaces with the jacket wall 22. A reduced wall 64 in energy absorption strap 24 also creates a stress riser in which tearing will initiate. The depth of the offset 62 can be tuned to achieve the desired amount of dissipated energy.

Figure 5:
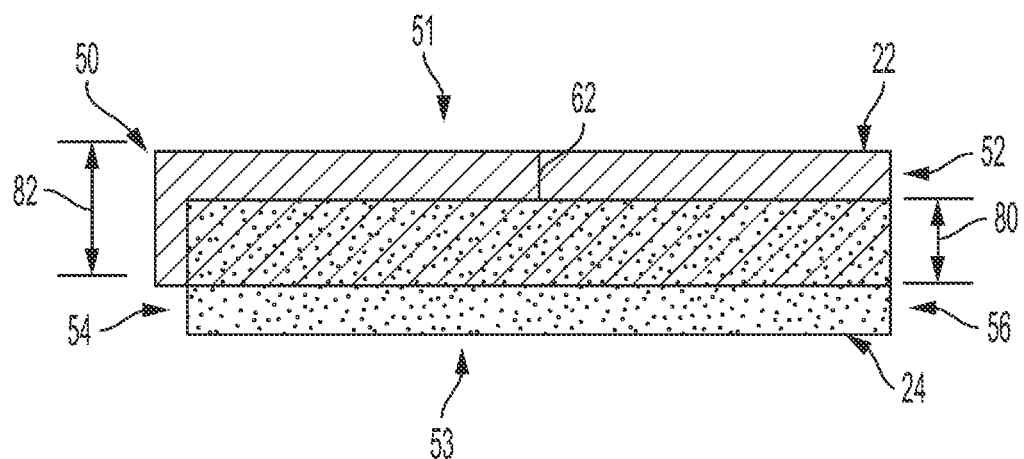
FIG. 5 is a side sectional view of the jacket wall with an integrally formed energy absorption strap having a constant thickness.
Figure 6:
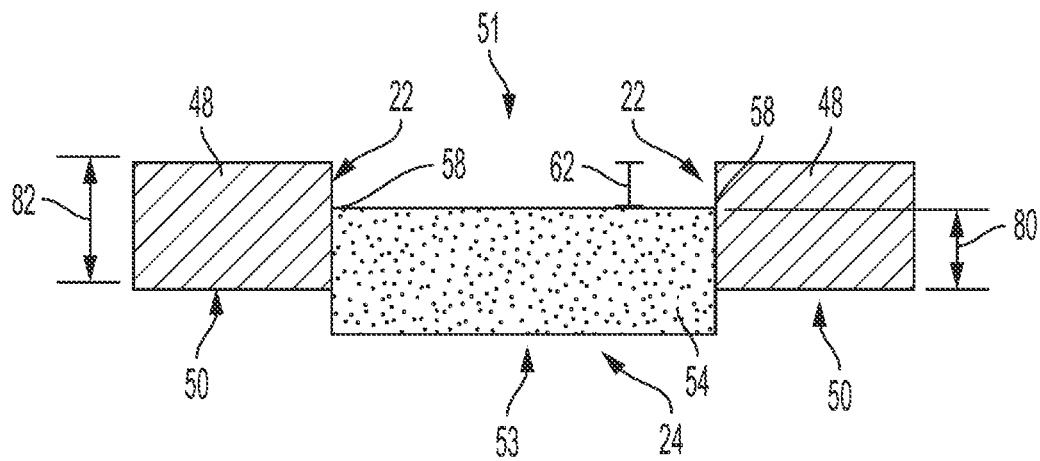
FIG. 6 is a front end sectional view of the jacket wall with an integrally formed energy absorption strap having a constant overlap.
Figure 7:
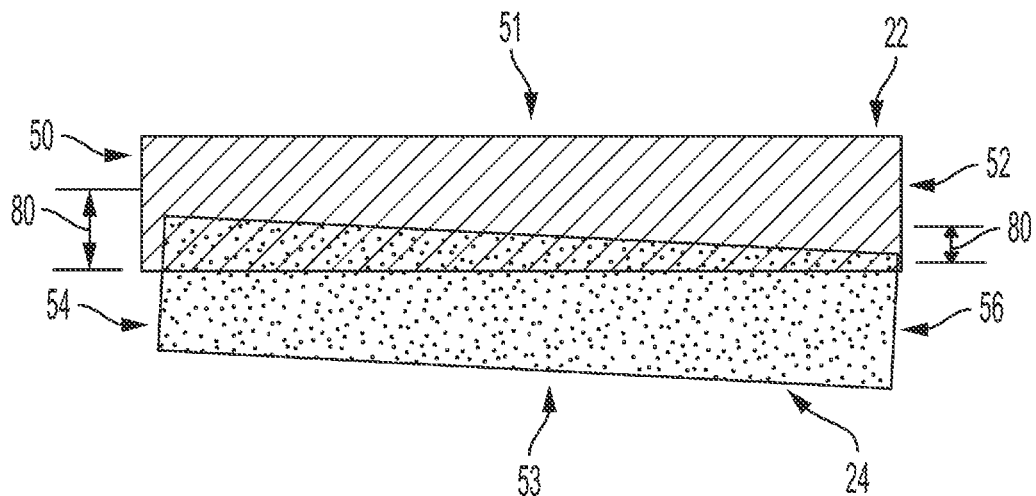
FIG. 7 is a side sectional view of the jacket wall with an integrally formed energy absorption strap having a variable overlap.

Referring to FIGS. 5-7, various energy absorption strap 24 configuration options are illustrated. An energy absorption strap thickness 80 and a jacket wall thickness 82 is constant from the first end 54 to the second end 56 of the energy absorption strap 24 in some embodiments (see FIGS. 5 and 6). As used herein, the term "thickness" refers to overlap that will provide the strain energy for the tearing portion of the EA mechanism. This portion is added to the strain energy provided by the bend radius and thickness 82 of the offset portion referred to as 24.

The energy absorption strap 24 can also have a variable thickness 80 from the first end 54 to the second end 56 (see FIG. 7). The thickness 80 of the energy absorption strap 24 is determined by the amount of offset 62 between the energy absorption strap 24 and the jacket wall 22. The tear lines 58 are shown located on either side of the energy absorption strap 24 where the energy absorption strap 24 interfaces with the jacket wall 22.

Figure 8:
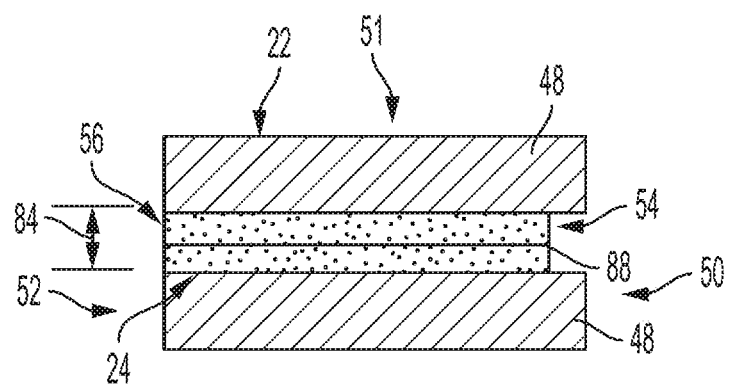
FIG. 8 is a top view of the jacket wall with an integrally formed energy absorption strap having a variable thickness.
Figure 9:
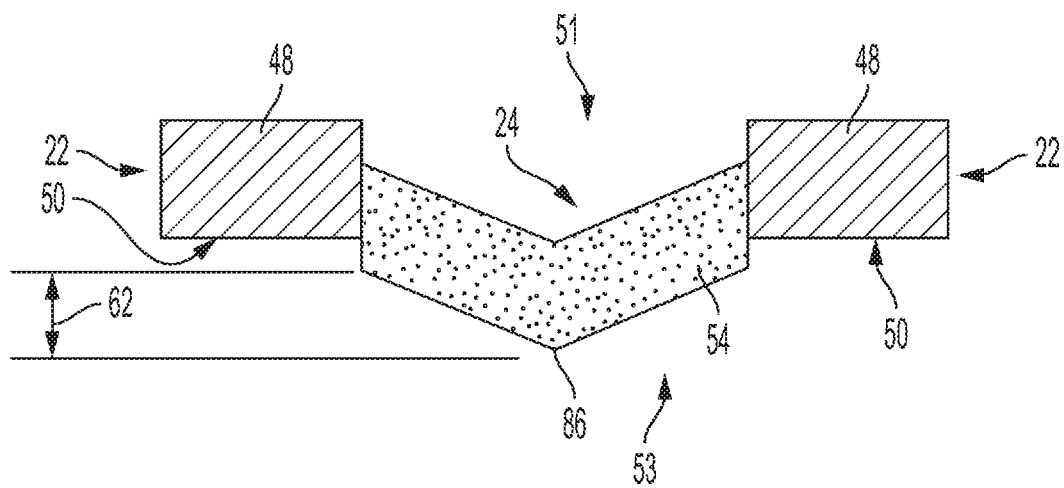
FIG. 9 is a front sectional view of the jacket wall with an integrally formed energy absorption strap having a variable amount of section thickness.
Figure 10:
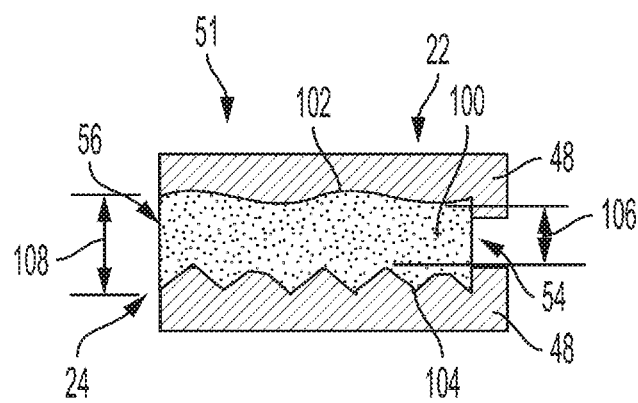
FIG. 10 is a top view of the jacket wall with an integrally formed energy absorption strap having an undulating width design.
Figure 11:
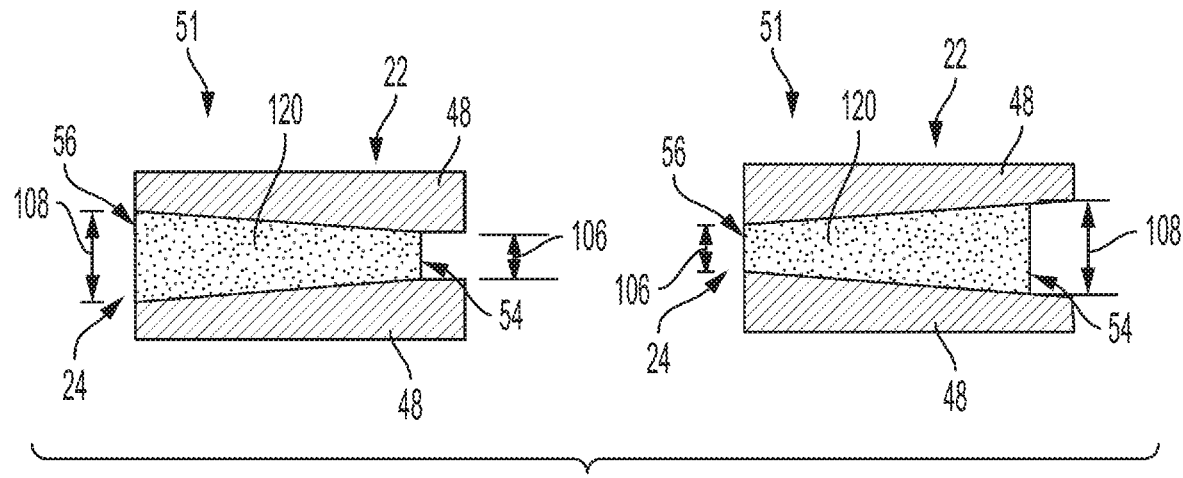
FIG. 11 is a top view of the jacket wall with an integrally formed energy absorption strap having a tapered width design.
Figure 12:
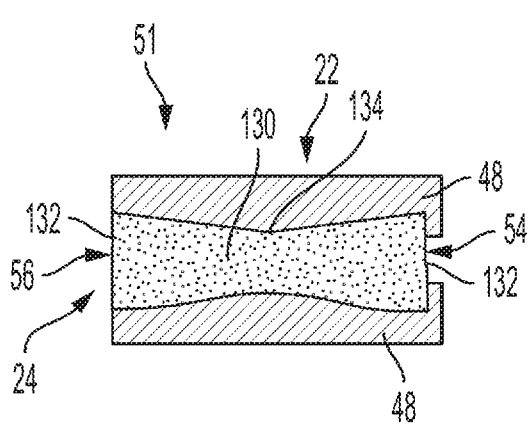
FIG. 12 is a top view of the jacket wall with an integrally formed energy absorption strap having an hourglass variable width design.
Figure 13:
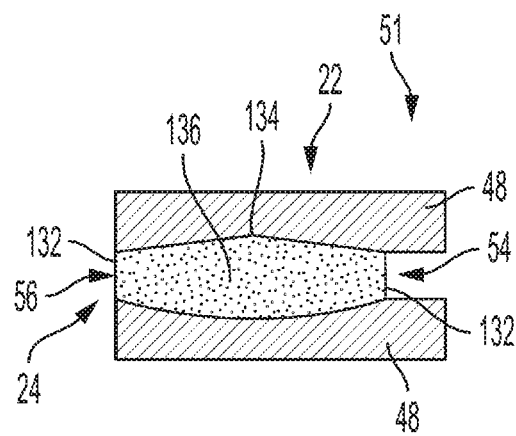
FIG. 13 is a top view of the jacket wall with an integrally formed energy absorption strap having a reverse hourglass variable width design.
Figure 14:
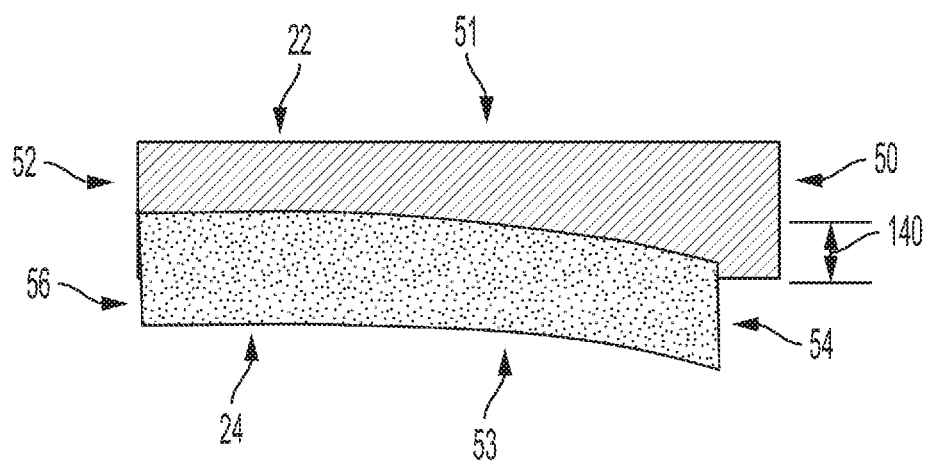
FIG. 14 is a side sectional view of the jacket wall with an integrally formed energy absorption strap having a curved increasing overlap.
Figure 15:
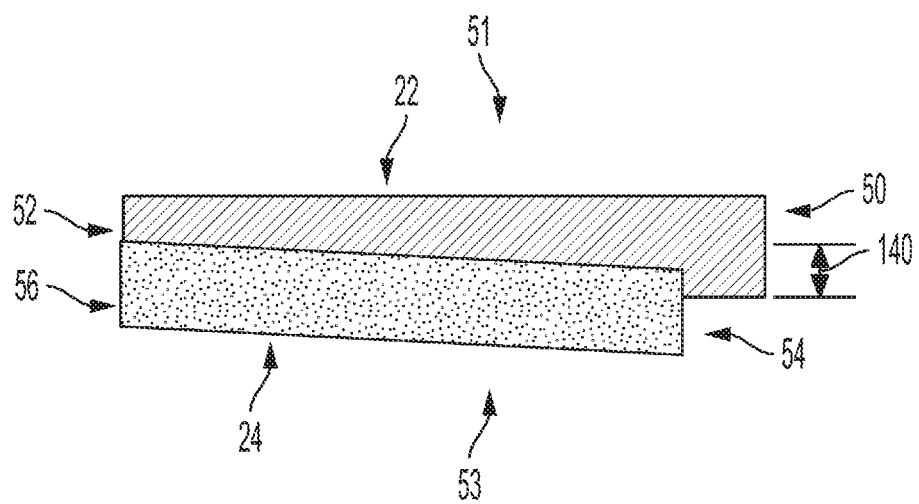
FIG. 15 is a side view of the jacket wall with an integrally formed energy absorption strap having a linear increasing overlap.
Figure 16:
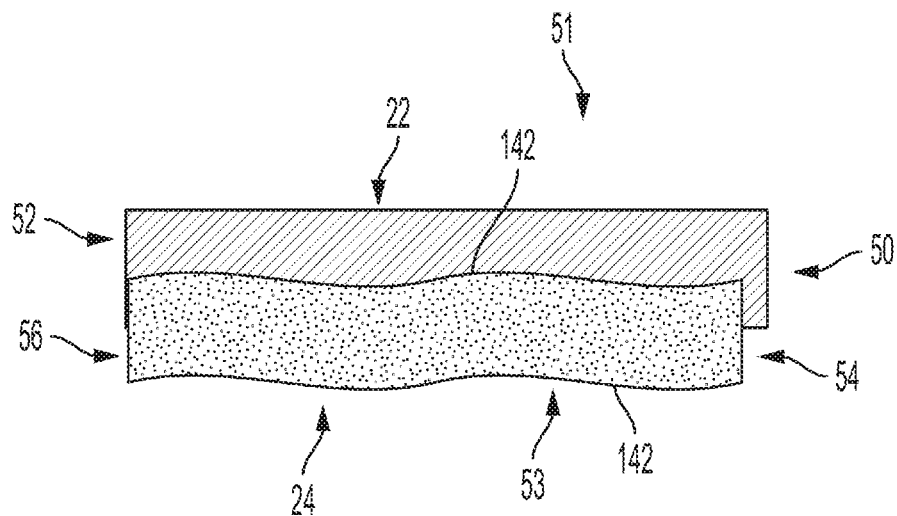
FIG. 16 is a side sectional view of the jacket wall with an integrally formed energy absorption strap having a curvilinear waveform overlap.
Figure 17:
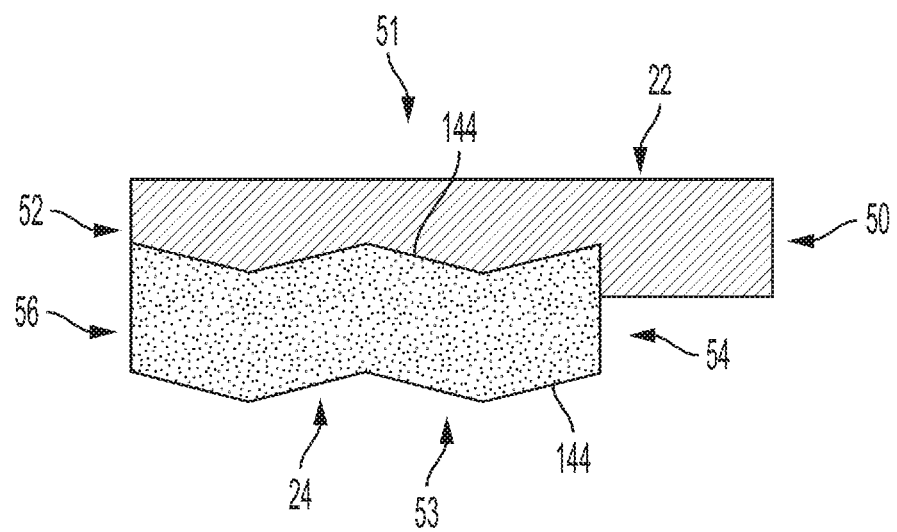
FIG. 17 is a side sectional view of the jacket wall with an integrally formed energy absorption strap having a segment wise waveform overlap.
Figure 18:
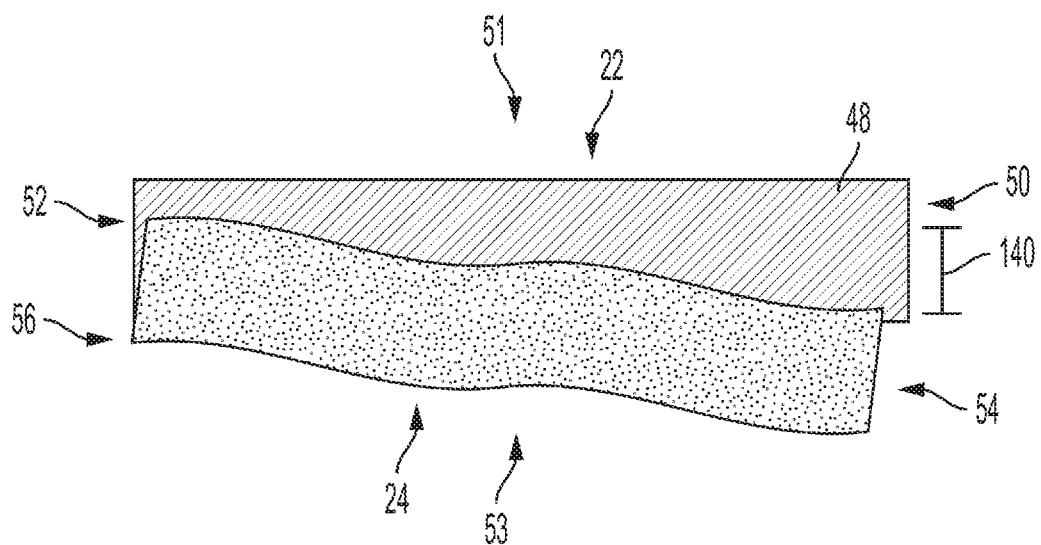
FIG. 18 is a side sectional view of the jacket wall with an integrally formed energy absorption strap having an undulating increasing overlap design.
Figure 19:
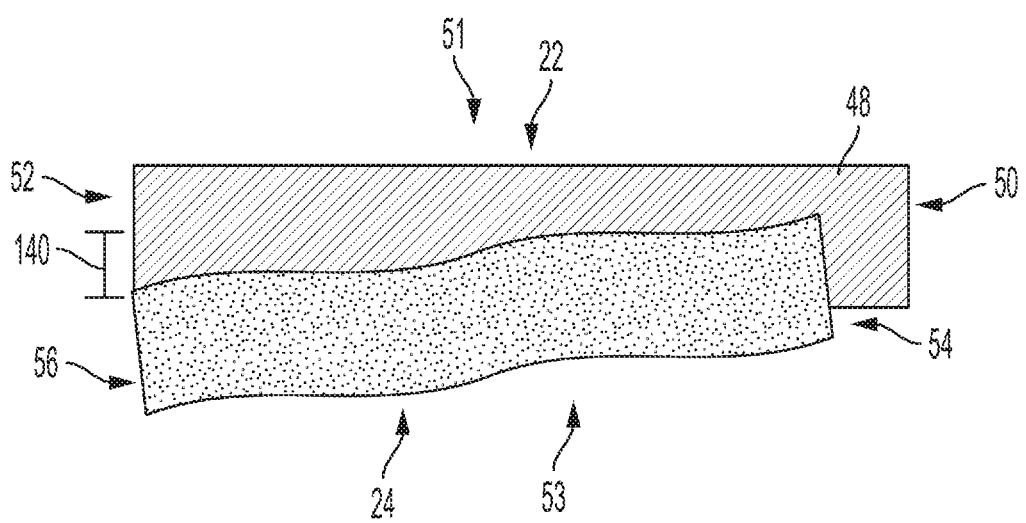
FIG. 19 is a side view of the jacket wall with an integrally formed energy absorption strap having an undulating decreasing overlap.

Referring to FIGS. 8 and 9, a jacket wall 22 with an integrally formed energy absorption strap 24 is shown. The energy absorption strap 24 may have a constant width 84 with a variable amount of offset 62 along with a peak 86 at a central axis 88 of the energy absorption strap 24 (see FIG. 9). The offset 62 is smaller at an area closer to the interface of energy absorption strap 24 and the jacket wall 22 and gradually increasing in height as it approaches the central axis 88 of the energy absorption strap 24.

Referring to FIGS. 10-13, various shapes of the energy absorption strap 24 of the jacket wall 22 are illustrated. The energy absorption strap 24 may have an undulating pattern 100 with both curvilinear 102 and sawtooth edges 104, the pattern having a minimum width 106 and a maximum width 108 with a constant and repeating pattern. The minimum width 106 is less than the maximum width 108 (see FIG. 10). The energy absorption strap 24 may have a tapered pattern 120 that has a maximum width 108 at the first end 54 and a minimum width 106 at the second end 56, or a minimum width 106 at the first end 54 and a maximum width 108 at the second end 56 (see FIG. 11). The energy absorption strap 24 may have an hourglass pattern 130 with a line segment 132 at each of the first end 54 and the second end 56, and each line segment 132 meeting at a curvilinear segment 134. The line segments 132 are wider than the curvilinear segment 134 in some embodiments (see FIG. 12). The energy absorption strap 24 may have a reverse hourglass pattern 136 with a line segment 132 at each of the first end 54 and the second end 56, and each line segment 132 meeting at a curvilinear segment 134. The line segments 132 are narrower than the curvilinear segment 134 (see FIG. 13).

Referring to FIGS. 14-19, further embodiments for variations for the energy absorption strap 24 of the jacket wall 22 are illustrated. The energy absorption strap 24 may have an increasing elevation 140 (this "elevation 140" is also analogous to "thickness 80" which heretofore has been referred to as "overlap"), with the elevation 140 being greater at the first end 54 of the energy absorption strap 24, when compared to the second end 56. The increasing elevation 140 may be a curved increase, wherein the change in elevation 140 begins more sharply at the first end 54 of the energy absorption strap 24 and then begins to taper off as it approaches the second end 56 (see FIG. 14). The increasing elevation 140 may be a linear increase where the change in elevation is at a constant rate from the first end 54 of the energy absorption strap 24 to the second end 56 of the energy absorption strap 24 (see FIG. 15). The energy absorption strap 24 may have an elevation 140 that increases and decreases in a curvilinear waveform 142 (see FIG. 16) or in a segment wise waveform 144 (see FIG. 17). The energy absorption strap 24 may have a pattern with an overall increase in elevation 140 from the first end 54 of the energy absorption strap 24 to the second end 56 of the energy absorption strap 24 (see FIG. 18). The energy absorption strap 24 may have a pattern with an overall decrease in elevation 140 from the first end 54 of the energy absorption strap 24 to the second end 56 of the energy absorption strap 24 (see FIG. 19).

Figure 20:
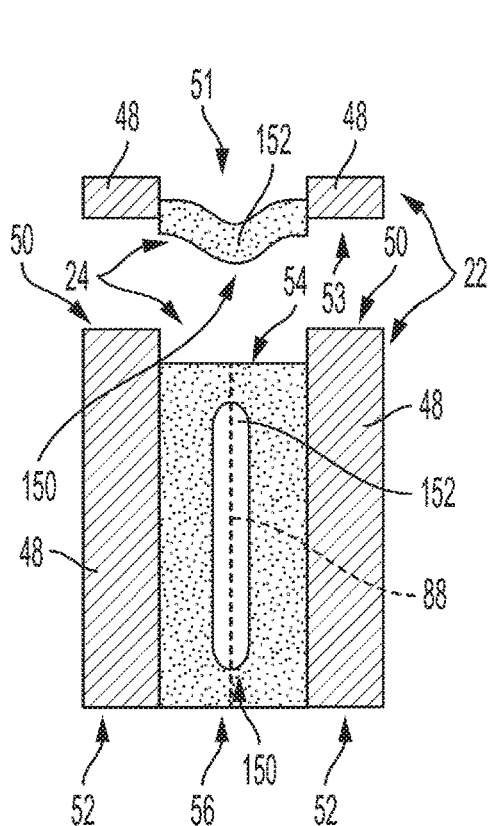
FIG. 20 is a front and top view of the integrally formed energy absorption strap with a dart feature having a single long protrusion.
Figure 21:
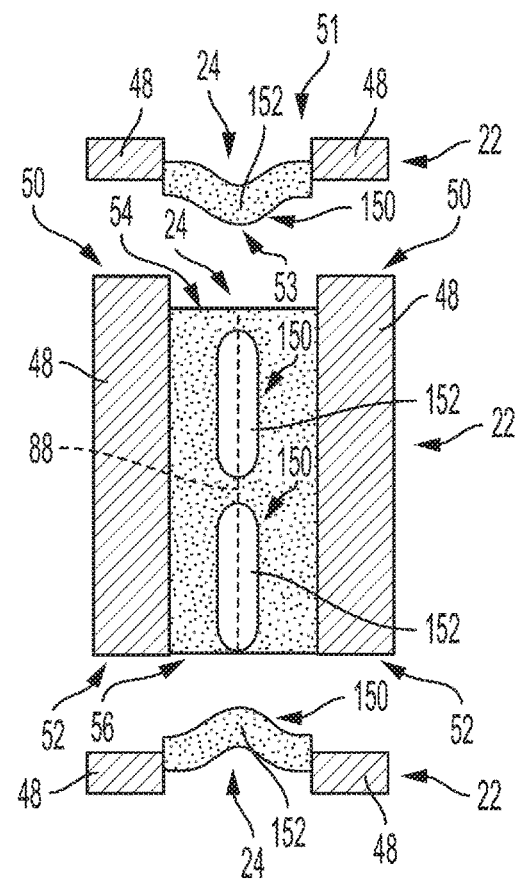
FIG. 21 is a front and top view of the integrally formed energy absorption strap with a dart feature having multiple protrusions along a central axis of the upper jacket.
Figure 22:
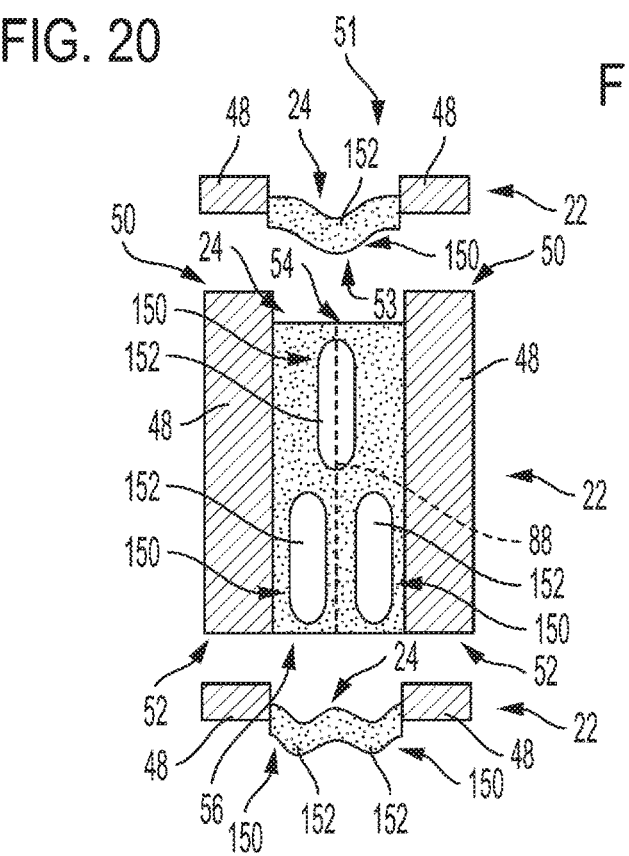
FIG. 22 is a front and top view of the dart feature having a plurality of protrusions.
Figure 23:
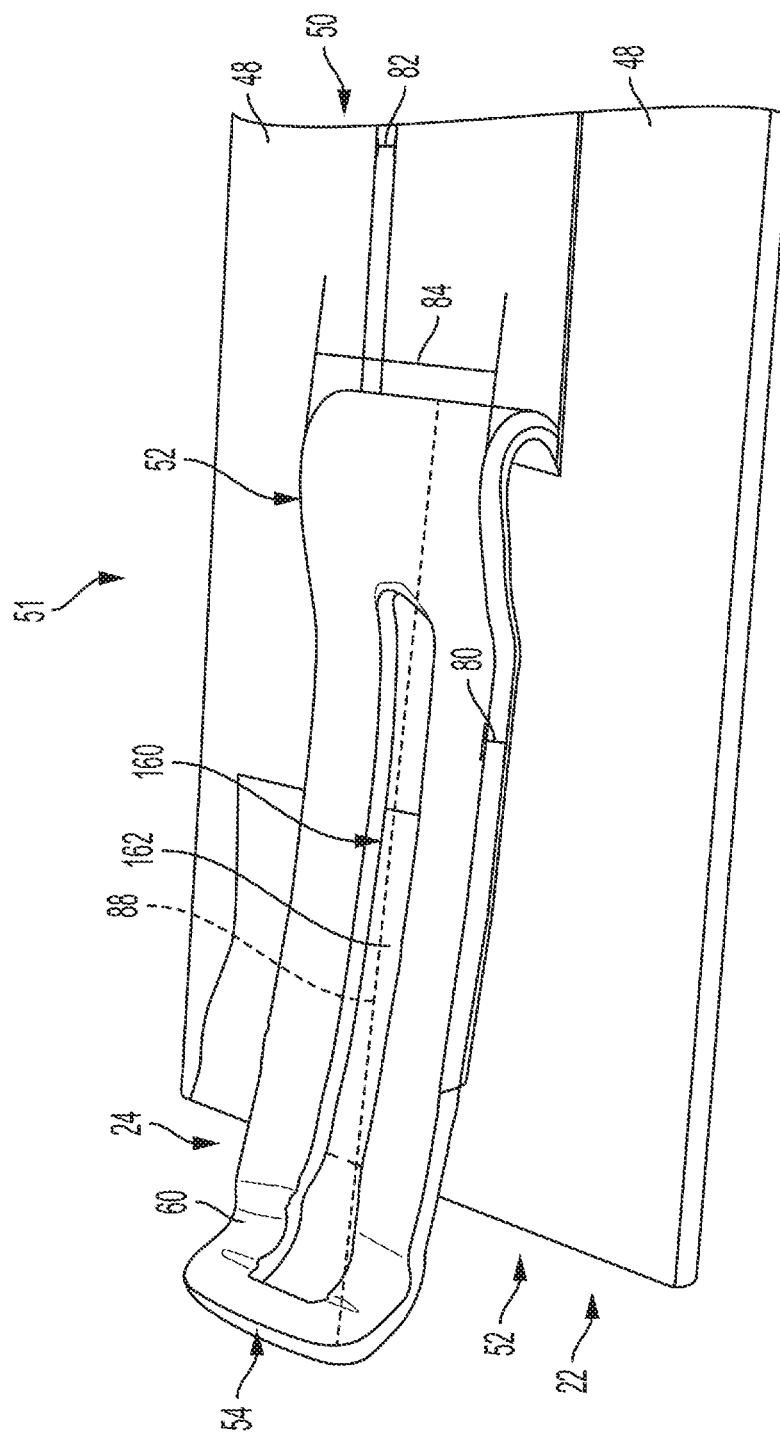
FIG. 23 is an illustration of a jacket wall with an integrally formed energy absorption strap having a standard slot design after tearing.
Figure 27:
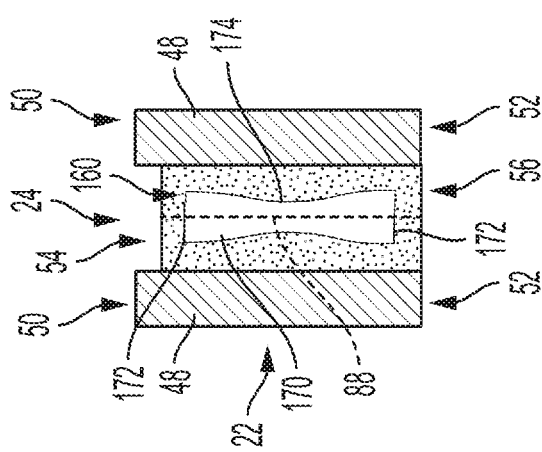
FIG. 27 is a top view of the jacket wall with an integrally formed energy absorption strap having an hourglass slot design.
Figure 28:
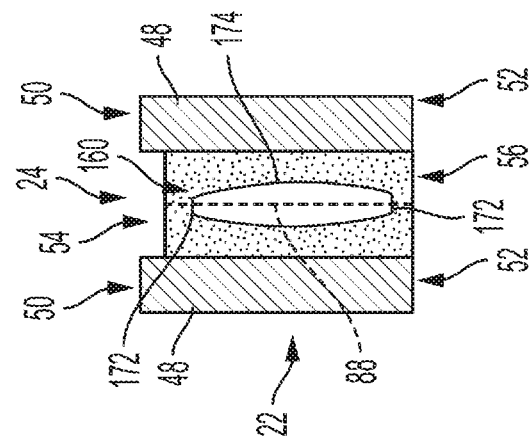
FIG. 28 is a top view of the jacket wall with an integrally formed energy absorption strap having a reverse hourglass slot design.

Referring to FIGS. 20-22, a dart feature 150 within the energy absorption strap 24 of the jacket wall 22 is illustrated.

The dart feature 150 is a protrusion 152 of energy absorption strap 24. The dart feature 150 in the energy absorption strap 24 increases the moment of inertia, meaning more energy is needed in order to cause the energy absorption strap 24 to roll up. The protrusion 152 can vary in length and the section height as required. The protrusion 152 can be formed in the same manufacturing operation that creates the energy absorption strap 24.

The dart feature 150 is a single long protrusion 152 in some embodiments (see FIG. 20). The single long protrusion 152 is located along the central axis 88 of the energy absorption strap. The dart feature 150 may be made up of multiple protrusions 152 in other embodiments, each protrusion 152 being singular along a lateral plane and being located along the central axis 88 of the energy absorption strap 24 (see FIG. 21). The dart feature 150 can made up of a plurality of protrusions 152, some of the protrusions 152 being side by side along a lateral plane in parallel with each other, each being offset from the central axis 88 in an opposite direction from one another, and some protrusions 152 being singular along a lateral plane and being located directly on the central axis 88 of the energy absorption strap 24 (see FIG. 22). The dart feature 150 may also be some combination of the above for tunability.

Referring to FIGS. 23-28, a slot 160 within the energy absorption strap 24 of the jacket wall 22 is illustrated. The slots 160 can vary in size and shape, in order to alter the strap's energy absorption rate along with alterations to the energy absorption strap width 84 that is configured to meet the energy absorption requirements. The bend radius is determined by the packaging envelope of the upper jacket assembly 16 and lower jacket assembly 14, and will change as a result of the load applied and any external constraint that restricts its growth. However, the slot width controls the amount of material being deformed, which affects the energy level. The slot 160 can be an elongated slot 162 meaning the energy absorption strap 24 has a single elongated slot 162 along the central axis 88 of the energy absorption strap 24. The elongated slot 162 is located at a substantially equal distance from either side where the energy absorption strap 24 interfaces with the jacket wall 22 (see FIGS. 23 and 24).

The slot 160 may be a flanged slot 164 (see FIG. 25) with a flat rim 166 around the flanged slot 164 itself, the flanged slot 164 being located on the central axis 88 of the energy absorption strap 24. The slot 160 may be a tapered slot 168 (see FIG. 26), the tapered slot 168 being located along the central axis 88 of the energy absorption strap 24. The tapered slot 168 may be narrower at the first end 54 of the energy absorption strap 24 and become wider as it approaches the second end 56 of the energy absorption strap 24. The tapered slot 168 may also be wider at the first end 54 of the energy absorption strap 24 and become narrower as it approaches the second end 58 of the energy absorption strap 24. The slot 160 may be in the shape of an hourglass slot 170 (see FIG. 27). The hourglass slot 170 is located along the central axis 88 of the energy absorption strap 24 and the hourglass slot 170 has a line segment 172 at each of the first end 54 and the second end 56 of the energy absorption strap 24. Each line segment 172 meets at a curvilinear segment 174 and the line segments 172 are wider than the curvilinear segment 174. The slot 160 may be a reverse hourglass slot 176 (see FIG. 28). The reverse hourglass slot 176 is located along the central axis 88 of the energy absorption strap 24 and the reverse hourglass slot 176 has a line segment 172 at each of the first end 54 and the second end 56 of the energy absorption strap 24. Each line segment 172 meets at a curvilinear segment 174 and the line segments 172 are narrower than the curvilinear segment 174.

Throughout this specification, the term "attach," "attachment," "connected," "coupled," "coupling," "mount," or "mounting" shall be interpreted to mean that a structural component or element is in some manner connected to or contacts another element, either directly or indirectly through at least one intervening structural element, or is integrally formed with the other structural element.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. A steering column assembly comprising:
   a lower jacket;
   an upper jacket at least partially received within the lower jacket;
   a jacket wall integrally formed with the lower jacket, the jacket wall extending longitudinally from a first end to a second end and having a first side and a second side; and
   an energy absorption strap offset from the first side of the jacket wall to form a recess extending along the jacket wall, the energy absorption strap having a first end and a second end, the energy absorption strap having at least one tear line at an interface with the jacket wall, wherein the jacket wall is disposed within an opening defined by the upper jacket to operatively connect the lower jacket with the upper jacket.

2. The steering column assembly of claim 1, wherein the opening of the upper jacket includes a hook feature which engages with a loop feature of the first end of the energy absorption strap.

3. The steering column assembly of claim 1, wherein a connecting thickness between the energy absorption strap edge and the jacket wall is less than a thickness at the second end of the energy absorption strap.

4. The steering column assembly of claim 1, wherein the energy absorption strap has a thickness that is constant from the first end to the second end of the energy absorption strap.

5. The steering column assembly of claim 1, wherein the energy absorption strap is integrally formed with the jacket wall.

6. The steering column assembly of claim 1, wherein the energy absorption strap includes an undulating pattern with either curvilinear or sawtooth edges, the pattern having a minimum width and a maximum width with a constant and repeating pattern, the minimum width being less than the maximum width.

7. The steering column assembly of claim 1, wherein the energy absorption strap includes a tapered pattern with a maximum width at the first end and a minimum width at the second end.

8. The steering column assembly of claim 1, wherein the energy absorption strap includes a tapered pattern with a minimum width at the first end and a maximum width at the second end.

9. The steering column assembly of claim 1, wherein the energy absorption strap includes one of an hourglass pattern with a line segment and a curvilinear segment.

10. The steering column assembly of claim 1, wherein the energy absorption strap includes one of a reverse hourglass pattern with a line segment and a curvilinear segment.

* * * * *